US012403865B2

United States Patent
Schroeter et al.

(10) Patent No.: US 12,403,865 B2
(45) Date of Patent: Sep. 2, 2025

(54) VISIBILITY OBSTRUCTION DETECTION FOR A VEHICLE

(71) Applicant: Ford Global Technologies, LLC, Dearborn, MI (US)

(72) Inventors: Robert Schroeter, Livonia, MI (US); Mahmoud Yousef Ghannam, Canton, MI (US); Justin Miller, Berkley, MI (US); Jake Schwartz, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 139 days.

(21) Appl. No.: 18/455,769

(22) Filed: Aug. 25, 2023

(65) Prior Publication Data

US 2025/0065846 A1 Feb. 27, 2025

(51) Int. Cl.
| | | |
|---|---|---|
| *B60R 1/00* | (2022.01) | |
| *B60R 11/04* | (2006.01) | |
| *B60S 1/08* | (2006.01) | |
| *G06V 10/764* | (2022.01) | |
| *G06V 20/58* | (2022.01) | |

(52) U.S. Cl.
CPC .............. *B60S 1/0822* (2013.01); *B60R 11/04* (2013.01); *G06V 10/764* (2022.01); *G06V 20/58* (2022.01)

(58) Field of Classification Search
CPC ..... B60S 1/0822; B60R 11/04; G06V 10/764; G06V 20/58
See application file for complete search history.

(56) References Cited

U.S. PATENT DOCUMENTS

| | | | |
|---|---|---|---|
| 9,972,100 B2 * | 5/2018 | Lu | B60Q 1/085 |
| 11,328,428 B2 | 5/2022 | Kahlbaum | |
| 2005/0035926 A1 * | 2/2005 | Takenaga | B60S 1/0818 345/8 |
| 2015/0070499 A1 * | 3/2015 | Roelke | G06V 20/56 348/148 |
| 2015/0085118 A1 | 3/2015 | Ahiad | |
| 2015/0256729 A1 * | 9/2015 | Wato | H04N 23/51 348/311 |
| 2019/0344715 A1 * | 11/2019 | Lu | B60R 1/24 |
| 2020/0158553 A1 * | 5/2020 | Jamieson | G01F 23/0007 |
| 2022/0092315 A1 | 3/2022 | Tamaoki | |

(Continued)

OTHER PUBLICATIONS

Tom Keldenich, Encoder Decoder What and Why?—Simple Explanation, Inside Machine Learning, Oct. 12, 2021, 9 pages.

(Continued)

*Primary Examiner* — Howard D Brown, Jr.
(74) *Attorney, Agent, or Firm* — Frank Lollo; Price Heneveld LLP (57) ABSTRACT

A vehicle includes a window separating a compartment of the vehicle from a region external to the vehicle. The window includes an outer surface. An imaging device is in the compartment and configured to capture an image of the region external to the vehicle through the window. Control circuitry is in communication with the imaging device and configured to receive the image from the imaging device, detect an obstruction in the image data corresponding to a substance on the window, and generate an output in response to the detection of the obstruction, wherein the imaging device is disposed within 50 millimeters (mm) from the window.

20 Claims, 8 Drawing Sheets

(56) References Cited

U.S. PATENT DOCUMENTS

| | | | |
|---|---|---|---|
| 2023/0182742 A1* | 6/2023 | Han | B60W 40/02 701/23 |
| 2023/0242079 A1* | 8/2023 | Hikida | B60S 1/0844 348/148 |
| 2024/0083465 A1* | 3/2024 | Tatipamula | B60W 60/00182 |

OTHER PUBLICATIONS

Philipp Lizerski, Lukas Ruff, Robert A. Vandermeulen, Billy Joe Franks, Marius Kloft, Klaus-Robert Muller, Explainable Depp One-Class Classification, ICLR 2021, Mar. 18, 2021, 25 pages, Kaiserslautern, Germany, Berlin, Germany, Saabrucken, Germany.
The Encoder-Decoder Architecture, Dive Into Deep Learning, Sagemaker Studio Lab, 3 pages, https://d21.ai/chapter_recurrent-modern/encoder-decoder.html.

\* cited by examiner

VISIBILITY OBSTRUCTION DETECTION FOR A VEHICLE

FIELD OF THE DISCLOSURE

The present disclosure generally relates to image processing in a vehicle environment and, more particularly, to visibility obstruction detection for a vehicle.

BACKGROUND OF THE DISCLOSURE

Conventional image processing techniques for detecting moisture conditions on or around a vehicle may be limited.

SUMMARY OF THE DISCLOSURE

According to a first aspect of the present disclosure, a vehicle includes a window separating a compartment of the vehicle from a region external to the vehicle. The vehicle includes an imaging device in the compartment and configured to capture an image of the region external to the vehicle through the window. The vehicle includes control circuitry in communication with the imaging device. The control circuitry is configured to receive the image from the imaging device, process the image in a fully-connected data description neural network (FCDDNN) trained to determine a moisture level, detect an obstruction in the image, correlate the obstruction with a substance on the window, classify the substance as water or debris based on the moisture level and generate an output in response to detection of the obstruction.

Embodiments of the first aspect of the present disclosure can include any one or a combination of the following features:
  a wiper selectively moveable along the window and a window clearing system including a controller in communication with the control circuitry and configured to operate the wiper in response to the output;
  the window clearing system includes a pump for pressurizing cleaning fluid to apply to the window, wherein the controller is configured to selectively operate the pump in response to the output;
  the output generated by the control circuitry is based on the classification of the obstruction as water or debris;
  the controller is configured to operate the wiper in response to classification of the substance as water and operate the pump in response to classification of the substance as debris;
  the imaging device is disposed within 50 millimeters (mm) from the window;
  the control circuitry includes a training module that trains the FCDDNN based on manual operation feedback;
  the manual operation feedback includes manual operation of at least one switch controlling at least one of the wiper and the pump;
  the training module is configured to train the FCDDNN to differentiate between light sources in the region external and the substance on the window;
  the control circuitry is configured to classify a level of optical distortion with the moisture level of the substance;
  the window is a windshield of the vehicle extending at an oblique angle relative to a lens of the imaging device
  the imaging device is disposed within 15 millimeters of the window;
  the control circuitry is configured to detect another vehicle ahead of the vehicle; and classify the substance as tire splash from the other vehicle; and
  the control circuitry, wherein the automatic speed control system is configured to control the speed of the vehicle based on classification of the substance as tire splash from the other vehicle.

According to a second aspect of the present disclosure, a vehicle includes a windshield separating a compartment of the vehicle from a region external to the vehicle. The vehicle includes an imaging device in the compartment and is configured to capture an image of the region external to the vehicle through the windshield and control circuitry in communication with the imaging device. The control circuitry is configured to receive the image from the imaging device, detect an obstruction in the image corresponding to a substance on the windshield, and generate an output in response to the detection of the obstruction. The imaging device is disposed within 50 millimeters (mm) from the windshield.

Embodiments of the second aspect of the present disclosure can include any one or a combination of the following features:
  a wiper selectively moveable along the windshield and window clearing system including a controller in communication with the control circuitry and configured to operate the wiper in response to the output;
  the imaging device is disposed within 15 mm of the windshield; and
  the control circuitry is configured to classify a level of optical distortion with the moisture level of the substance.

According to a third aspect of the present disclosure, a vehicle includes a windshield separating a compartment of the vehicle from a region external to the vehicle. The vehicle includes a wiper selectively moveable along the windshield. The vehicle includes a window clearing system including a controller configured to operate the wiper. The vehicle includes an imaging device in the compartment and configured to capture an image of the region external to the vehicle through the windshield. The imaging device is disposed within 50 millimeters (mm) from the windshield and includes a lens. The windshield extends at an oblique angle relative to the lens. The vehicle includes control circuitry in communication with the imaging device and the window clearing system. The control circuitry configured to receive the image from the imaging device, process the image in a fully-connected data description neural network (FCDDNN) trained to determine a moisture level, detect an obstruction in the image, correlate the obstruction with a substance on the windshield, classify the substance as water or debris based on the moisture level, and generate an output in response to classification of the substance as water. The controller is configured to operate the wiper in response to the output.

Embodiments of the third aspect of the present disclosure can include any one or a combination of the following features:
  the window clearing system includes a pump for pressurizing cleaning fluid to apply to the windshield, wherein the controller is configured to selectively operate the pump in response to classification of the substance as debris.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

Figure 1:
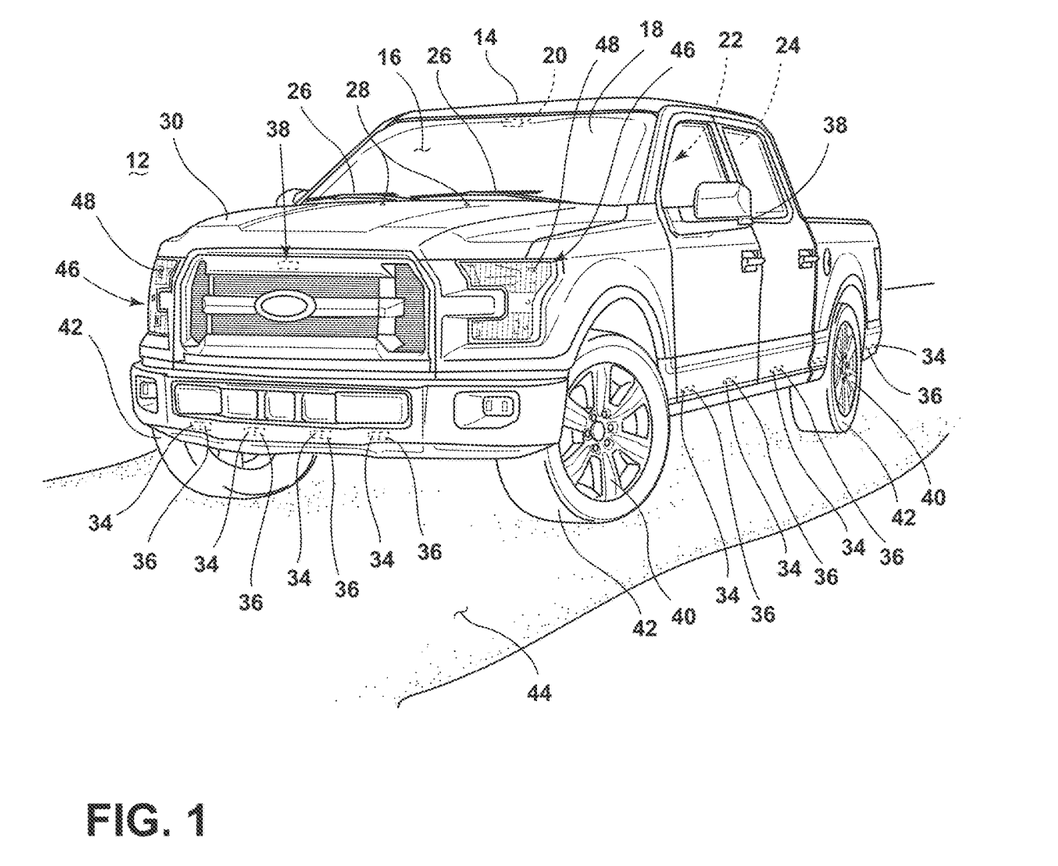
FIG. 1 is a perspective view of a vehicle incorporating a moisture detection system according to one aspect of the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to visibility obstruction detection for a vehicle 14. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

Referring generally to FIGS. 1-8, a moisture detection system 10 uses image processing to detect conditions of a region external 12 to a vehicle 14, such as water on an outer surface 16 of a windshield 18 of the vehicle 14 or water ahead of or around the vehicle 14. In general, the present moisture detection system 10 may provide for enhanced space utilization within the vehicle 14 by allowing an imaging device 20 of the moisture detection system 10 to be positioned near or far from the windshield 18 while still detecting and classifying obstructions on the windshield 18. Further, the moisture detection system 10 may provide for enhanced visibility by optimizing clearing of the windshield 18 and/or maneuvering, or proposing to maneuver, the vehicle 14 to a target location to enhance visibility and/or control. The moisture detection system 10 may further provide for more accurate detection of weather conditions, such as rain, humidity, fog, or other moisture conditions in the region external 12 to the vehicle 14, thereby allowing for enhanced responsiveness for other vehicle systems.

Referring now to FIG. 1, the moisture detection system 10 for the vehicle 14 may incorporate an imaging device 20 positioned within a cabin 22 of the vehicle 14. For example, the imaging device 20 may be positioned adjacent to the windshield 18 of the vehicle 14 within a passenger compartment 24 of the vehicle 14 and be oriented in a vehicle-forward orientation. At least one wiper 26 is positioned on the outer surface 16 of the windshield 18 for clearing the windshield 18 of water, debris, or other substances thereon. As will be described further with respect to FIG. 2, a window cleaning system may be employed for cleaning the windshield 18 or any one of a plurality of windows of the vehicle 14 that may accumulate moisture or other substances on the window from the region external 12 to the vehicle 14. The window cleaning system may include a nozzle 28 positioned adjacent to the wipers 26 between a hood 30 of the vehicle 14 and the windshield 18 of the vehicle 14 and be configured to spray cleaning fluid onto the windshield 18. The cleaning fluid can include a cleaning agent, such as methanol, glycol, or other fluids for clearing substances off of the outer surface 16 of the windshield 18 when in use with the wipers 26. It is contemplated that the cleaning fluid may incorporate water, which may be warmed to aid in a defrost operation of the windshield 18 in some examples.

Still referring to FIG. 1, a plurality of distance sensors 34, 36, 38 are incorporated in the vehicle 14 to detect other objects, such as other vehicles 14, in the region external 12 to the vehicle 14. The detection devices may include ultrasonic and/or infrared detectors, as well as cameras 38, such as the imaging device, that are configured to detect distances from the vehicle 14 to surrounding objects in the region external 12 to the vehicle 14. Accordingly, the images from the imaging device 20 may be used to detect distance from the vehicle 14 to objects within a field of view of the imaging device.

As will be described further with respect to FIG. 2, the distance sensors 34, 36, 38 may include any one of the radio detection and ranging sensors (RADARs 34), light detection and ranging sensors (LIDARs 36), and cameras 38. In some examples, ultra-wideband (UWB) sensors are employed for detecting objects in the region external 12. In general, the distance sensors 34, 36, 38 may be configured to detect cross-traffic events and/or detect objects in blind spots of the vehicle 14 to aid a user of the vehicle 14 in maneuvering of the vehicle 14. In the present example, the data collected by the detection sensors is used by the moisture detection system 10 to allow the moisture detection system 10 to detect distance (e.g., a following distance 120) from the vehicle 14 to splash events 118 and to classify the importance, relevance, or priority, of the splash events 118 based on the distance.

Still referring to FIG. 1, the vehicle 14 includes a plurality of wheels 40 each having a tire 42 interacting with a driving surface 44 for the vehicle 14. Friction between each tire 42 and the driving surface 44 may be influenced by moisture conditions between the tires 42 and the driving surface 44. Accordingly, the moisture detection system 10 may be employed to control driving of the wheels 40 to enhance maneuverability of the vehicle 14 along the driving surface 44.

The vehicle 14 includes at least one lighting assembly 46, such as a headlamp assembly having headlights 48 configured to illuminate the region external 12 to the vehicle 14. For example, the lighting assemblies may be configured to illuminate the region external 12 to the vehicle 14 at a plurality of illumination levels (e.g., high beams, low beams, etc.). Control of the lighting assemblies and the power levels and/or the illumination levels thereof may be enhanced by the moisture detection system 10. For example, moisture conditions in the region external 12 detected by the moisture detection system 10 may cause the moisture detection system 10 to control the power levels of the lighting assemblies due to reduced visibility from the moisture conditions.

Figure 2:
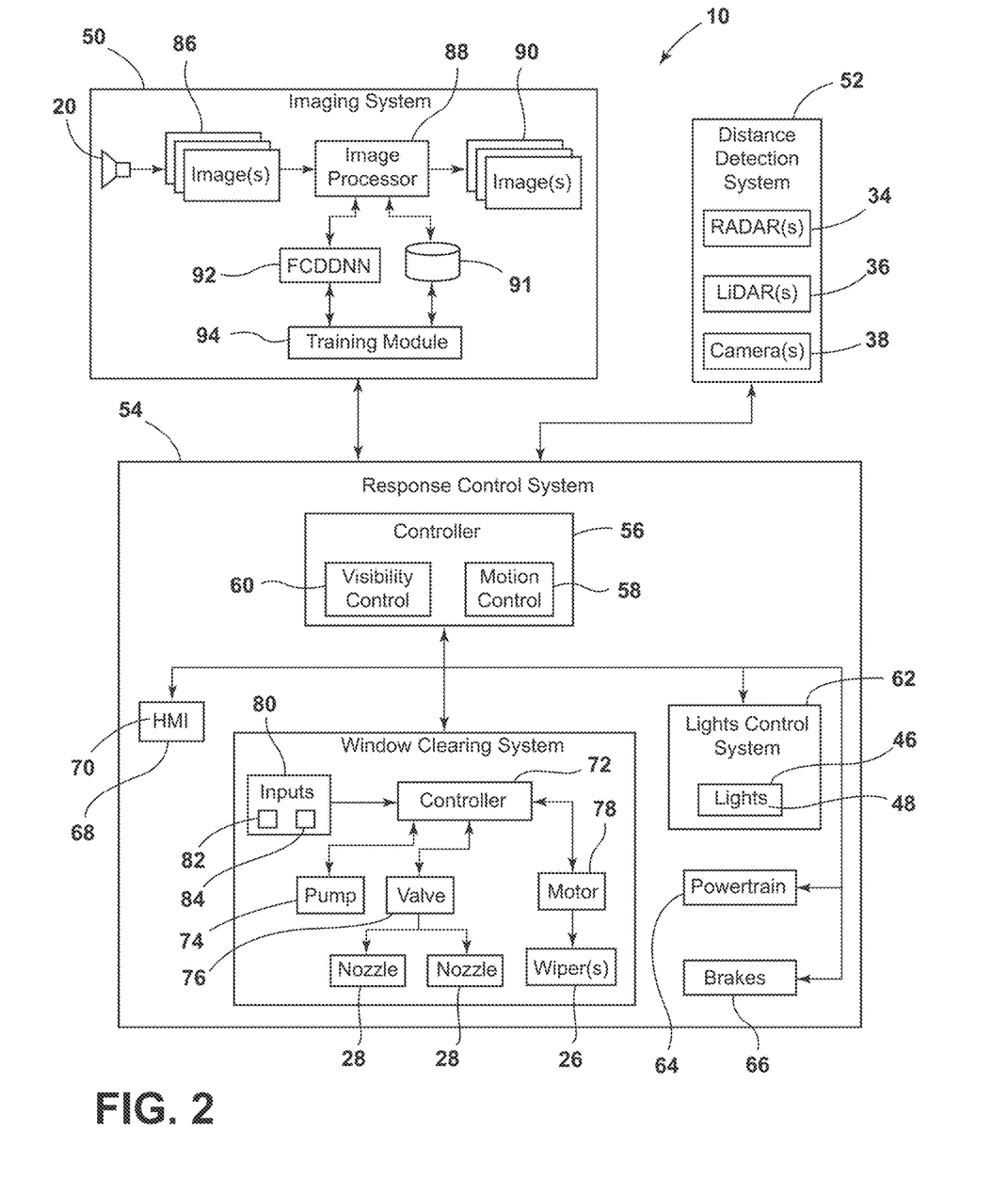
FIG. 2 is a functional block diagram of a moisture detection system for a vehicle according to one aspect of the present disclosure.

Referring now to FIG. 2, the moisture detection system 10 includes an imaging system 50, a distance detection system 52, and a response control system 54 in communication with the imaging system 50 and the distance detection system 52. In general, data from the imaging system 50 and/or the distance detection system 52 be communicated to the response control system 54, and the response control system 54 may control one or more visibility features and/or motion control features of the vehicle 14. For example, the response control system 54 includes one or more controllers 56, 72 having at least one processor and memory in communication with the processor. The memory may store instructions that, when executed by the processor(s) of the response control system 54, cause the response control system 54 to perform various tasks related to enhancing visibility of the region external 12 from the compartment of the vehicle 14 and/or motion control for the vehicle 14. In general, one or more of the controllers 56, 72 and/or other electrical components that provide for decision-making via software may be referred to as control circuitry.

For example, a response controller 56 of the response control system 54 may include a motion control unit 58 and a visibility control unit 60. The visibility control unit 60 may be configured to control the window clearing system, a light control system 62, and/or any other system influencing visibility through one or more of the windows of the vehicle 14. The motion control unit 58 may control communication to one or more vehicle systems, such as a powertrain 64 of the vehicle 14, a brake system 66 of the vehicle 14, or any other motion control system for the vehicle 14. For example, the motion control unit 58 may include a speed sensor in the powertrain 64 that detects rotations of gearing in the powertrain 64, however, other speed sensors may be used to detect or infer the speed of the vehicle (RF waves, inductive sensing, capacitive sensing, etc). Further, the response control system 54 may include and/or be in communication with a display 68, such as a human-machine interface (HMI 70) in the compartment of the vehicle 14. The display 68 is configured to present messages to a user and/or allow the user to control the window clearing system, the light control system 62, or any other aspect related to visibility and/or motion of the vehicle 14. In general, the response control system 54 may be configured to actively control visibility and/or motion features for the vehicle 14 or to passively present messages at the display 68 to indicate visibility and/or motion target operations for the user to initiate.

With continued reference to FIG. 2, the window clearing system can include a window clearing controller 72 that controls the operation of a pump 74 that pressurizes the cleaning fluid for spraying the cleaning fluid via the nozzle 28 onto the windshield 18 as previously described. A valve 76 may fluidly interpose the pump 74 and the nozzle 28 to selectively allow the cleaning fluid to enter the nozzle 28.

The window-clearing controller may further be in communication with a motor 78 that drives the wipers 26. For example, the motor 78 may be configured to rotate the wipers 26 over the windshield 18 in response to signals from the window clearing controller 72. In some examples, the speed of the vehicle 14, as detected by the speed sensor, may be compared to detected splash events 122 and, in response to this detection, the motor 78 may be energized to operate at a particular number of rotations per minute (RPM). At least one switch 80 is in communication with the window clearing controller 72 and/or directly in communication with the motor 78, the pump 74, and/or the valve 76 to control dispensing of the cleaning fluid and/or driving of the wipers 26 via manual interaction. For example, the at least one switch 80 may include a first mechanism 82 that causes dispensing of the cleaning fluid on the windshield 18 and a second mechanism 84 that controls the operation of the wipers 26. For example, the first mechanism 82 may be a knob that, when pulled or pushed, causes the cleaning fluid to be dispensed, and the second mechanism 84 may be a button or knob that causes the wipers 26 to move over the windshield 18. It is contemplated that the window clearing controller 72 may be omitted in some examples and that the response control system 54 may directly control the window clearing operations. In such an example, at least one of the switches 80 interposes the valve 76 and the nozzle 28 (e.g., the first mechanism 82), at least one of the switches 80 interposes the motor 78 and the wipers 26 (e.g., the second mechanism 84). In either example, the user may manually control dispensing of the cleaning fluid and/or operation of the wipers 26, and such operations may also or alternatively be automatically controlled by the response control system 54. In another example, instructions to initiate wiping of the windshield 18 and/or cleaning of the windshield 18 are represented at the HMI 70, and automatic control of the window clearing system is omitted.

The visibility control unit 60 may also or alternatively be configured to control the lighting assemblies of the vehicle 14 based on moisture conditions detected by the imaging system 50, as previously described. For example, in the event that it is raining in the region external 12 to the vehicle 14, the headlights 48 may be automatically activated or the response control system 54 may communicate an instruction to present a message at the display 68 for the user to activate the headlights 48 in response to detection of moisture conditions in the region external 12 to the vehicle 14. Further, brightness levels (e.g., binary high-beams/low-beams or fine brightness controls) may be controlled by the response control system 54 actively or passively (e.g., presentation of messages at the display 68).

In general, the motion control unit 58 may control the various systems of the vehicle 14 related to motion control, such as driving of the wheels 40 (e.g., torque values), brakes of the brake system 66 (e.g., traction control, antilock brakes (ABS)), steering of the vehicle 14 (e.g., maneuvering along the driving surface 44), or any other motion control unit 58 for the vehicle 14. Similar to the operation of the visibility control unit 60, features of the vehicle 14 related to motion control may be presented at the display 68 in addition, or an alternative to, automatic control of maneuverability of the vehicle 14. For example, in an at least partially semi-autonomous mode of control for the vehicle 14, the visibility control unit 60 may communicate an indication to the user at the display 68 to reduce speed, maneuver the vehicle 14 to the left or the right, or the like, and, in an alternative, may control the speed, maneuverability to the left or the right, etc., in response to detection of the moisture conditions.

With continued reference to FIG. 2, the various responses communicated by the response control system 54 may be based on outputs from one or both of the imaging system 50 and the distance detection system 52. With particular reference to the imaging system 50, the imaging device 20 captures one or more images (captured images 86) of the region external 12 to the vehicle 14, which are then processed by an image processor 88 to detect moisture conditions on or around the vehicle 14 and produce one or more output images 90. The image processor 88 is in communication with a memory 91 that stores instructions that, when executed, cause the image processor 88 to detect water streaks, water droplets 108, splash events 118, splash sources 116, or any other optical distortion related to moisture condition detection and/or obstruction detection. Included with or in communication with the memory 91 is a fully convolutional data description network (FCDDNN 92), which may be a neural network that segments the image data and detects optical distortions in the captured images 86. The FCDDNN 92 may be trained by a training module 94 of the imaging system 50 that provides sample images and/or historical image data that presents optical distortion (e.g., optical distortion caused by moisture in an image). The FCDDNN 92 is employed to detect portions of the image that have distortion due to moisture conditions and will be described in further detail in reference to FIG. 5.

In addition to detecting moisture conditions, the image processor 88 is configured to detect any other obstruction within the field of view of the imaging device 20. For example, the obstruction may be environmental debris, such as droppings, leaves, sticks, non-water material, or any other substance that may stick to or land on the outer surface 16 of the windshield 18. The imaging system 50 may therefore distinguish between debris and water. For example, the FCDDNN 92 may be trained to score the obstruction with a level of opacity, light transmittance, light distortion, or the like. For example, debris may be associated with opacity, whereas water and/or other moisture conditions may be associated with bending of light through the obstruction.

In general, distance information from the distance detection system 52 and moisture classification and detection from the image processing system may be used by the response control system 54 to initiate the vehicle 14 response. For example, if moisture is detected on the windshield 18 above a particular threshold (e.g., a low visibility threshold), the imaging system 50 may communicate an output to the response control system 54 indicating environmental conditions of the region exterior. For example, the imaging system 50 may determine that it is raining, snowing, or otherwise precipitating in the region external 12, and communicate an indication to the response control system 54 to initiate the wipers 26. The image processing system may further differentiate between various forms of precipitation and/or obstructions on the windshield 18 to allow for an individualized response initiated by the control system based on the environmental conditions. For example, and as will be described with respect to the foregoing figures, the imaging system 50 may classify types of obstructions as moisture-related or light-related, and the signal communicated from the imaging system 50 of the response control system 54 may be dependent on the type of obstruction.

For example, the imaging system 50 may detect droppings on the windshield 18 and communicate an output for the response control system 54 to control the pump 74 of the window clearing system to spray the cleaning fluid onto the windshield 18. In another example, the imaging system 50 detects spray on the windshield 18 from splashing from another vehicle 14 ahead of the vehicle 14 and, in response, communicates a signal to the response control system 54 to control, or communicates a message to the HMI 70 for the user to control, the vehicle 14 to slow or adjust the positioning of the vehicle 14. The lighting assemblies may further be controlled in response to the detection of the moisture conditions to illuminate the region external 12 to the vehicle 14 at a particular power level/illumination level and/or to turn the headlights 48 on or off. These responses are exemplary and nonlimiting, such that any combination of responses may be performed by the moisture detection system 10 in response to classification by the imaging system 50.

Still referring to FIG. 2, feedback from the window clearing system, the moisture control system, the HMI 70, or other vehicle systems may be monitored by the response control system 54 to optimize the response by the moisture detection system 10. For example, upon a classification of the imaging system 50 of the environmental conditions in the region exterior, the imaging system 50 may communicate an instruction, or signal, to the response control system 54 that there is a light rain in the region external 12 to the vehicle 14. In response to detection of the light rain, the response control system 54 may initiate wiper control at a low speed. However, manual control of the wipers 26 to stop wiping of the windshield 18 via the second switch 80 may end the automatic control of the wipers 26. The response control may detect the feedback (e.g., the user manually shutting off the wipers 26) and update, or optimize, future responses when detecting light rain. In this way, the detection and classification of the environmental conditions, including the moisture conditions, and the response thereto may be enhanced to promote optimized responses by the user. It is contemplated that other examples related to other environmental conditions may be similarly optimized using feedback (e.g., manual adjustment of the lighting assemblies, manual steering adjustments, braking adjustments, etc.). In some examples, dismissal of the messages presented at the HMI 70 by the user may indicate that the response indicated in the message is undesired. Other examples of feedback and control will be described with respect to the proceeding figures.

Figure 3:
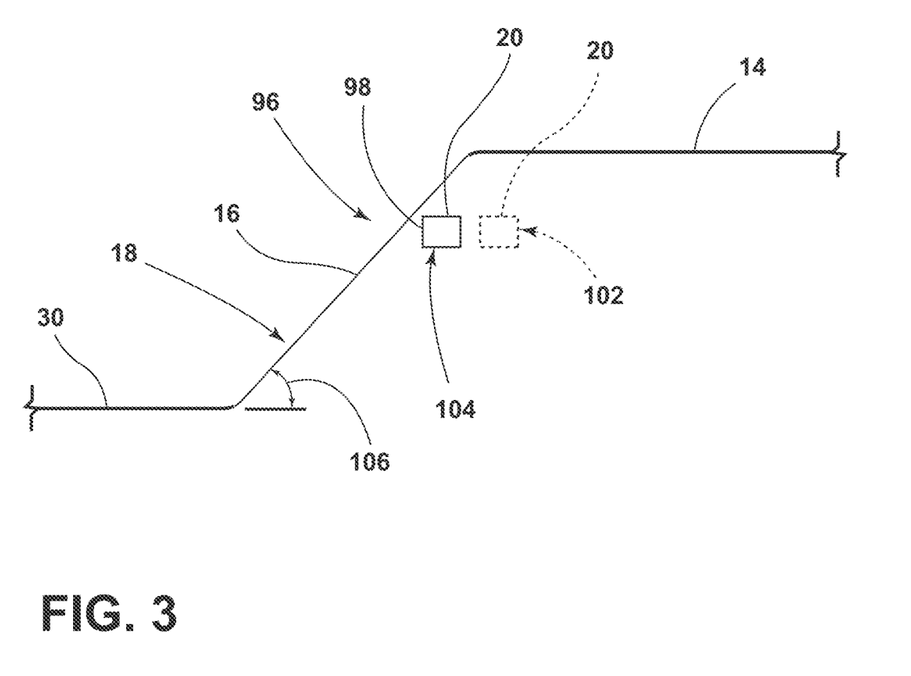
FIG. 3 is an exemplary cross-sectional view of a vehicle incorporating an imaging device adjacent to a windshield of the vehicle within an interior of the vehicle for detecting moisture conditions in the region external to the vehicle.

Referring now to FIG. 3, an exemplary arrangement of the imaging device 20 relative to the windshield 18 is illustrated to demonstrate the proximity of the imaging device 20 relative to the windshield 18 and the enhanced optical and spatial properties of the arrangement. Although illustrated as disposed adjacent to an upper portion 96 of the windshield 18, it is contemplated that the imaging device 20 may disposed along any portion of any window of the vehicle 14 that allows the imaging device 20 to capture a view of the region external 12 to the vehicle 14. In general, the software employed by the moisture detection system 10 of the present disclosure allows for the positioning of the imaging device 20 to be at least partially distance-independent between a lens 98 of the imaging device 20 and the window. For example, and as will be described with respect to FIGS. 4A and 4B, water on the windshield 18 (e.g., condensation, liquid water, frost) may appear different in the images depending on a distance of the imaging device 20 relative to the windshield 18. For example, water droplets 108 may appear as discrete circles, dots, or other geometric shapes that are more clearly defined along edges 110 of the shapes when the imaging device 20 is spaced further from the windshield 18 relative to being against the windshield 18 or very close to (e.g., between 0 and 35 mm) the windshield 18. The processes and methods carried out by the moisture detection system 10 of the present disclosure may allow for detection of the moisture conditions at either or both of a first position 102 of the imaging system 50 (e.g., at a first distance) and a second position 104 of the imaging device 20 (e.g., at a second distance less than the first distance). For example, the moisture on the windshield 18 may appear as blurry streaks or less defined optical distortions when an imaging device 20 is at the first distance to the windshield 18 due to the imaging device 20 being close to the water on the windshield 18 than when positioned at the second distance. By providing for a distance-independent arrangement, the moisture detection system 10 allows for enhanced spacing within the compartment, a larger and more detailed field of view for the imaging device, and a universal application to allow for imaging devices at different distances from the windshield 18.

With continued reference to FIG. 3, the windshield 18 may extend at an oblique angle 106 relative to vertical and/or horizontal orientations. For example, relative to the driving surface 44, the windshield 18 may slant upward. The oblique angle 106 of the windshield 18 may further distort or otherwise influence how the moisture conditions appear in the images captured by the imaging device. The distortion may be more pronounced in examples in which the imaging device 20 is in the second position 104 relative to the first position 102. Accordingly, challenges of capturing moisture conditions of the environment exterior to the vehicle 14 from images captured from an imaging device 20 within the compartment may be greater than or different from image processing for moisture detection of images captured from imaging devices outside of the compartment. For example, water droplets 108 on the windshield 18 may expand when landing on the windshield 18 to be more elongated than droplets 108 on a vertical, or more inclined, surface, such as the surface of a passenger window, a rear window, a cover for an exterior camera, etc.

Figure 4A:
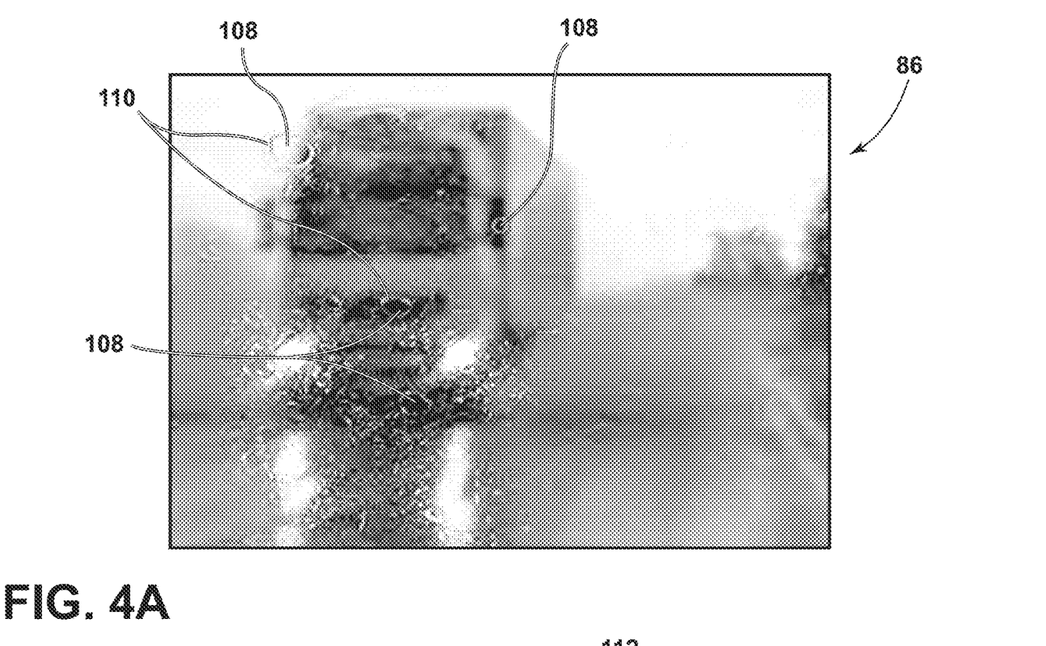
FIG. 4A is an exemplary image captured by an imaging device in an interior of the vehicle positioned away from the windshield resulting in detectable water droplets on the windshield.
Figure 4B:
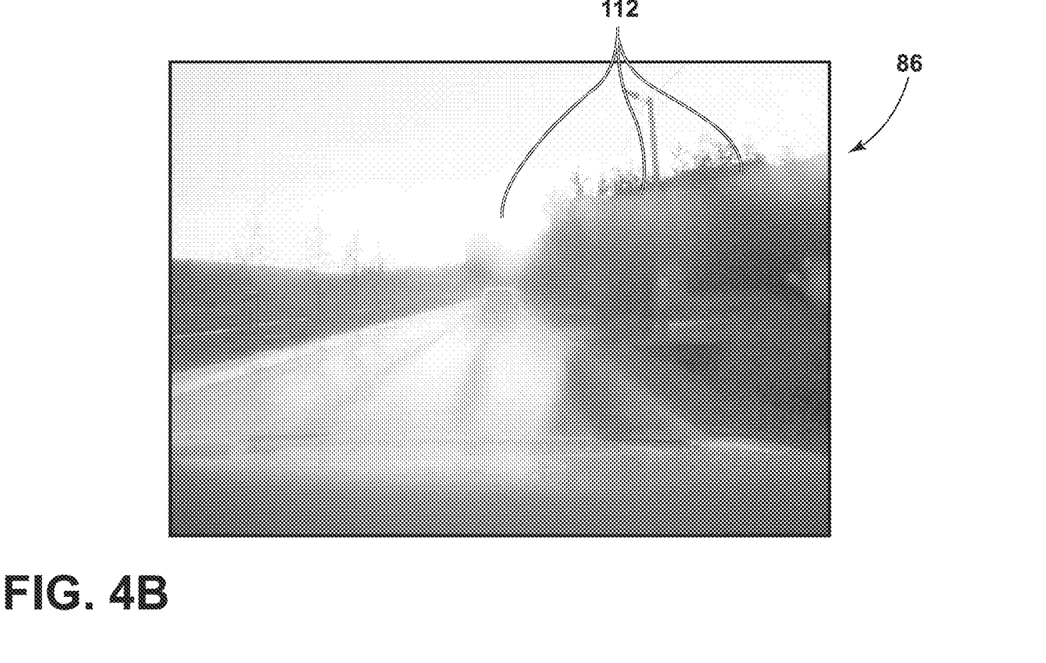
FIG. 4B is an exemplary image captured by an imaging device positioned within an interior of the vehicle and near the windshield demonstrating detection of water streaks on the windshield.

Referring now to FIGS. 4A and 4B, differences in captured images 86 from the first position 102 relative to the second position 104 of the imaging device 20 in FIG. 3 are demonstrated. As illustrated in FIG. 4A (the first position 102), rainwater on the outer surface 16 of the windshield 18 may appear as droplets 108 having discrete shapes or edges 110 more clearly defined than a blur 112 due to water conditions as demonstrated in FIG. 4B (the second position 104). Using the current algorithm and processes by the moisture detection system 10, such optical distortion, though mild, may be detected. By way of example, a droplet detection algorithm may be suitable for detecting moisture conditions when the imaging device 20 is positioned far from the windshield 18, and a blur 112 detection algorithm may be employed by the imaging system 50 to detect moisture conditions on the windshield 18 when the imaging device 20 is positioned closer to the windshield 18 (FIG. 4B). Accordingly, the moisture detection system 10 may provide for enhanced spacing within the vehicle 14 by providing the imaging device 20 close to the windshield 18.

In some examples, the second position 104 is within 50 mm of the windshield 18. In some examples, the second position 104 is between 0 mm and 35 mm from the windshield 18. In some examples, the second position 104 is positioned between 0 mm and 10 mm from the windshield 18. In each of these examples, the second position 104 is proximate to the windshield 18 to provide for an enhanced field of view and spacing within the compartment. In these examples, the first position 102 is further away from the windshield 18 than the second position 104.

Figure 5:
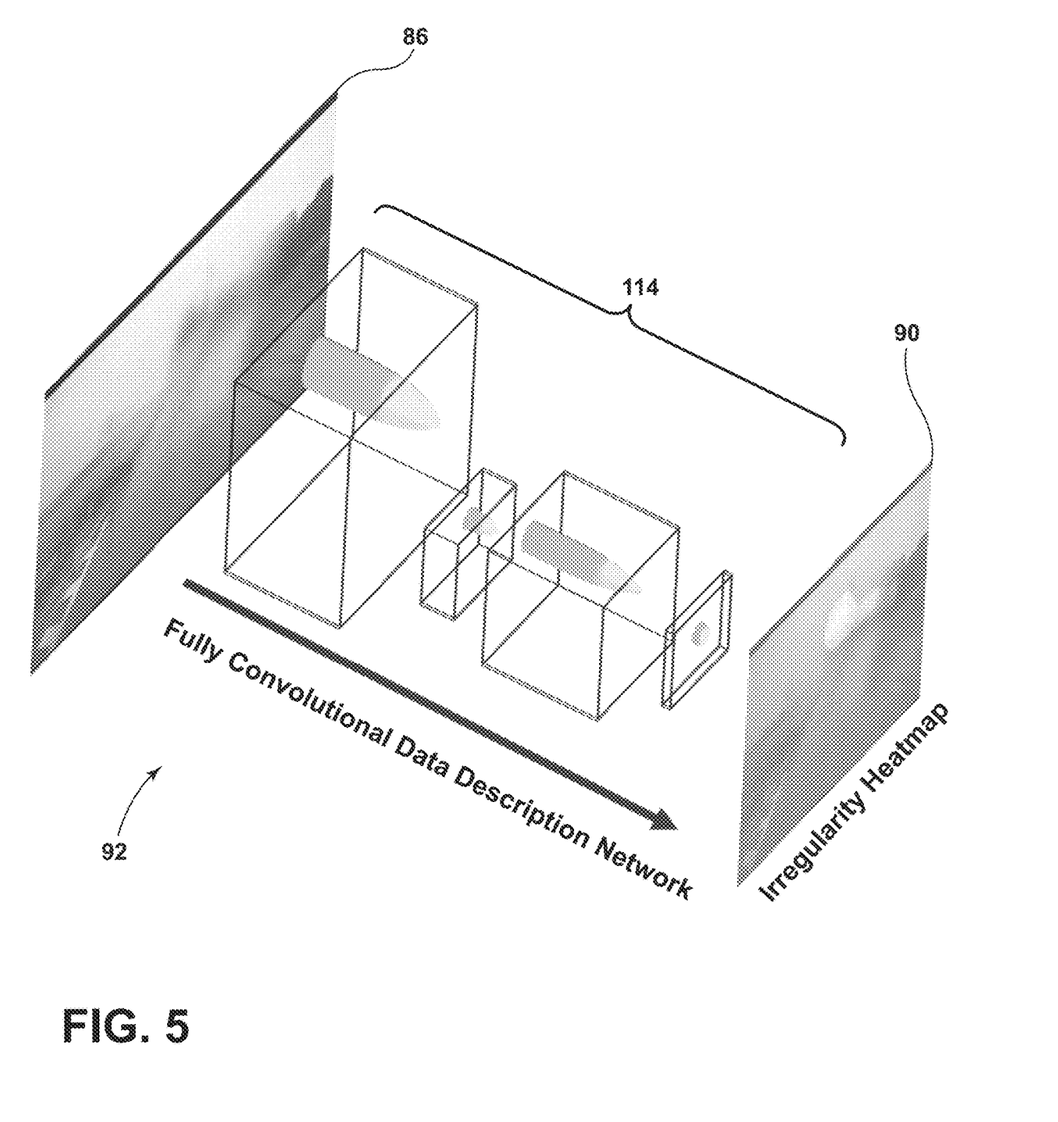
FIG. 5 is a representation of a fully convolutional data description (FCDD) network processing an image captured by an imaging device positioned near the windshield and producing image data that demonstrates an obstruction in the image.

Referring now to FIG. 5, the FCDDNN 92 is demonstrated processing the captured image of FIG. 4B to produce the corresponding output image. The FCDDNN 92 is a deep learning model designed for the purpose of unsupervised irregularity detection in data and operates by learning the underlying patterns and structures within the image data to distinguish normal patterns from anomalous patterns. The FCDD may include a plurality of layers 114, with each layer being a convolutional layer. Because each layer may be convolutional, the FCDDNN 92 may capture spatial dependencies and maintain the spatial structure of the input data.

In the FCDDN, the input data is passed through a series of convolutional layers 114, which extract relevant features at different levels of abstraction. These convolutional layers 114 may be followed by pooling layers 114 to downsample feature maps and reduce spatial dimensions of the feature maps. The output of the convolutional layers 114 may then be flattened and fed into fully connected layers 114, which perform further feature extraction and map the learned features to irregularity scores. Irregularity detection can be achieved by comparing the computed irregularity scores to a predefined threshold, where scores above the threshold indicate anomalous instances. In the present examples, the predefined thresholds may correspond to edge continuity of shapes in the image to detect distortion caused by moisture (e.g., blurriness). These thresholds may be actively adjusted based on the user feedback previously described (e.g., the user manually activating wipers 26 and/or the clearing process, the user manually activating the headlights 48, etc.).

Figure 6A:
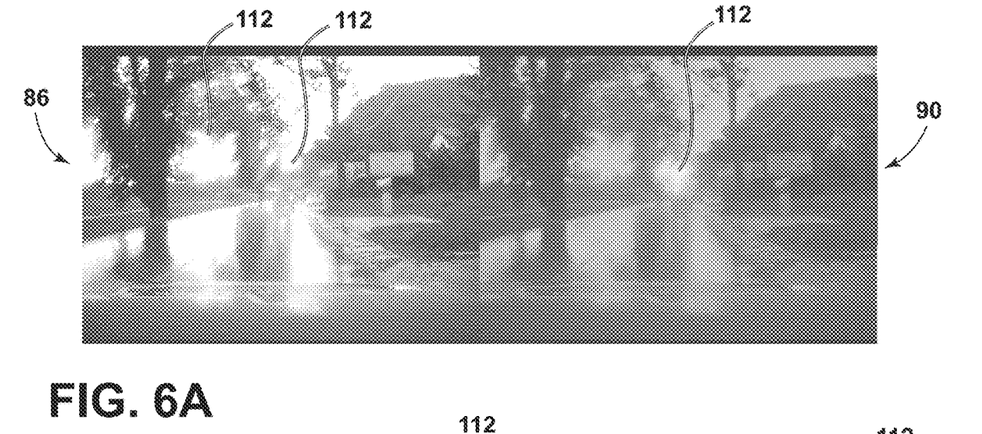
FIG. 6A-6C are captured images alongside image data that demonstrates obstructions on a windshield 18 of a vehicle after processing through a FCDD network.
Figure 6B:
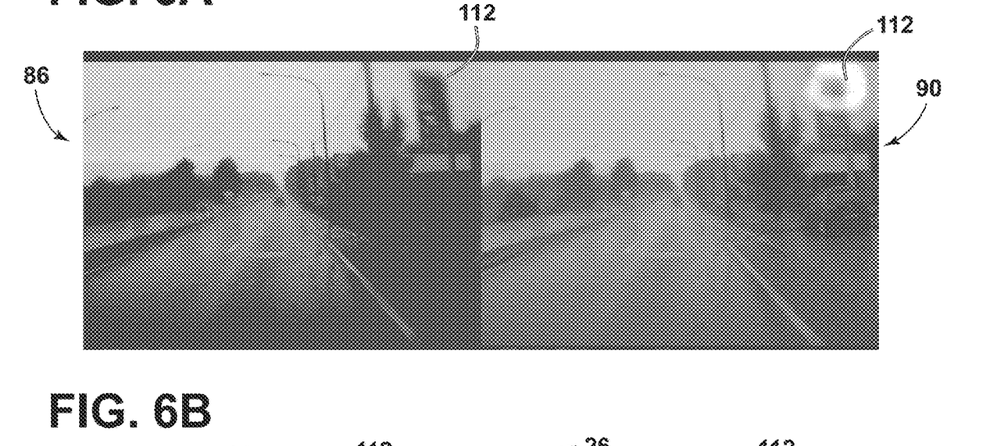
Figure 6C:
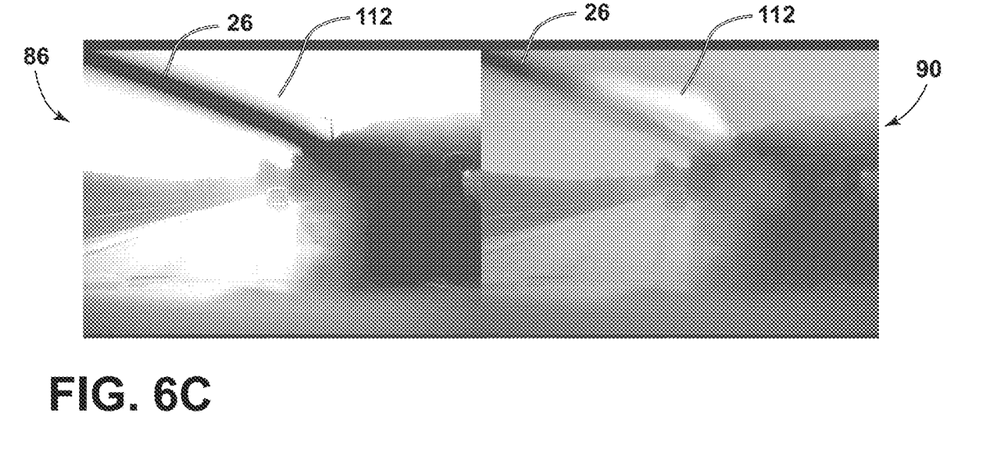

Referring now to FIGS. 6A-6C, exemplary captured images 86 from the imaging device 20 directed to the windshield 18 are depicted alongside filtered image data (output images 90) that indicate moisture conditions on the windshield 18. The imaging system 50 may process the captured images 86 in the image processor 88, including processing the captured images 86 in one or more machine learning models and/or neural networks. The imaging system 50 may employ edge detection techniques, histogram equalization, linear filters, image segmentation, convolution, or any combination of any image processing techniques to detect at least one portion of the captured image having a distortion or an obstruction. For example, and with reference to FIGS. 6A and 6B, the imaging system 50 may detect the blur 112 on the windshield 18 corresponding to wetting conditions (e.g., moisture on the windshield 18). In another example, the imaging system 50 detects non-moisture conditions, such as one of the wipers 26 moving across the windshield 18 (FIG. 6C). In these examples, detection may be applied to the captured images 86 to associate groups of pixels of the captured images 86 with surrounding pixels in order to classify the image data as moisture-related or not moisture related. For example, lane detection may be employed by the imaging system 50 to identify one or more lane lines defining the plurality of lanes 126. In general, object classification may be performed by the imaging system 50, such as classifying other vehicles 14, streetlamps, trees, or any other object captured in the captured images 86.

In general, the FCDDNN 92 previously described with respect to FIG. 5 may be employed for providing a wetness estimate. Based on the wetness estimate, which may be a continuously changing value or a binary wet or non-wet value, the response control system 54 may determine the response of the moisture detection system 10. By employing the various layers 114 of the FCDDNN 92 in combination with manual feedback from the user as previously described with respect to FIG. 2, the techniques employed by the moisture detection system 10 may provide for enhanced reaction. For example, the wipers 26 may be activated when the user would ordinarily activate the wipers 26 or prior to when the user would ordinarily activate the wipers 26 based on the training of the FCDDNN 92. Further, the speed of the wipers 26 and/or activation of the pump 74 for cleaning the windshield 18 may be optimized based on the moisture level and/or previous activations of the wipers 26 or the pump 74. The headlights 48 of the vehicle 14 may also, or alternatively, be activated with limited false activations. For example, the FCDDNN 92 detects and classifies the image data as oncoming headlights 48 and differentiates oncoming headlights 48 from moisture conditions or non-moisture conditions. Further, objects having pronounced moiré effects (e.g., fences) may be differentiated by the FCDDNN 92. In some examples, the manual feedback includes the manual operation of the wiper (e.g., via the at least one switch 80) and/or maneuvering of the vehicle 14 away from a splash event 118. Further, and as will be described below, the adjusting the vehicle 14 to another lane or maintaining positions in a current lane may be manual feedback (e.g., ignoring a recommendation to change lanes or manual override of moving into another lane).

Figure 7A:
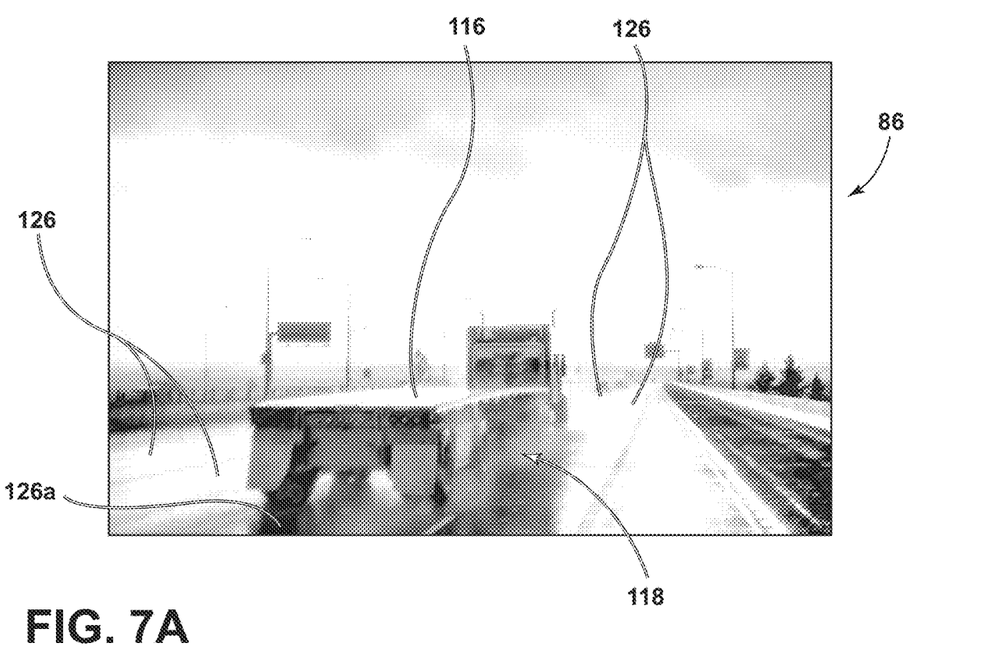
FIG. 7A-7B are exemplary images captured by an imaging device for the vehicle demonstrating splash events along a roadway for the vehicle, with FIG. 7B illustrating splash zones overlaying splash events.
Figure 7B:
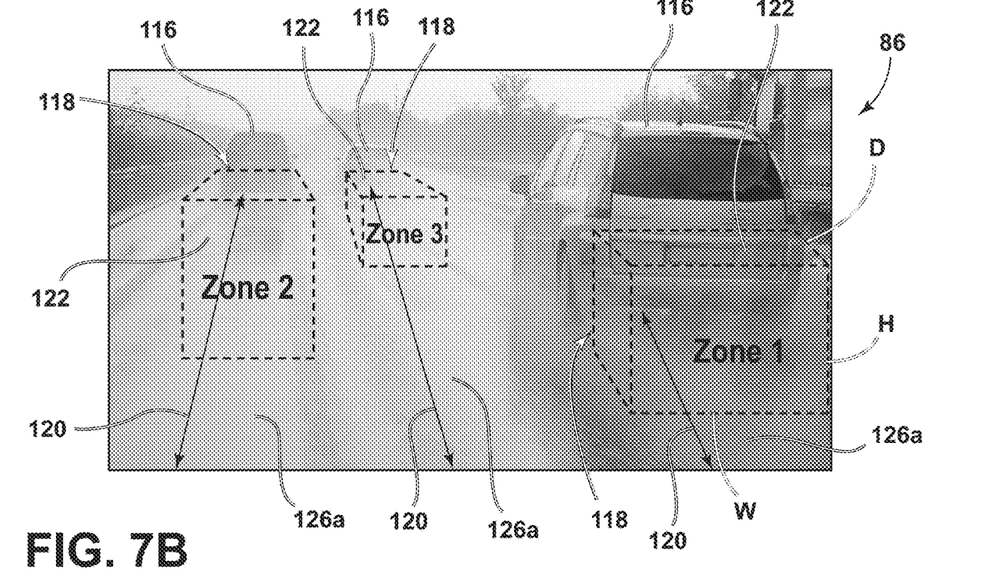

Referring now to FIGS. 7A and 7B, identification of at least one splash source 116 of splash events 118 may be performed by the imaging system 50 of the moisture detection system 10. For example, the splash sources 116 may include vehicles 14 and non-vehicles 14. The splash source 116 may be tires 42, a vehicle body, bridges, overpasses, construction equipment, hydrants, or any other source. Accordingly, the imaging system 50 may be configured to classify the sources using any one of the previous image detection techniques previously described.

With continued reference to FIGS. 7A and 7B, the imaging system 50 may further, or alternatively, determine a location of the splash source 116 relative to the vehicle 14. Based on the location of the splash source 116 (e.g., a source lane 126a), the response control system 54 may control any one of the window cleaning system the lighting system, the HMI 70, and/or the motion control system. For example, the imaging system 50 may locate the splash source 116 in another one of the plurality of lanes 126 other than the lane of the vehicle 14 and, based on location of the splash source 116 in another lane, may recommend maintaining course in the current lane of the vehicle 14. Thus, in general, the moisture detection system 10 may control or indicate a message to control the vehicle 14 to adjust lanes based on the location of the splash source 116. In the example, as illustrated in FIG. 7B, multiple splash sources 116 are detected by the imaging system 50, and the response control system 54 may recommend one of the plurality of lanes 126 based on proximity of the vehicle 14 to one or more of the plurality of splash events 118 (e.g., based on a following distance 120 of the vehicle 14 to the other vehicles 14, based on relative position of other vehicles 14 to other sources of splash such as a pothole). Stated another way, the moisture detection system 10 may detect a first splash source 116 and a second splash source 116, classify each splash source 116 with a relevance value, and recommend a lane or other location for the vehicle 14 based on the relevance values of the first and second splash sources 116. As will be described below, the moisture detection system 10 may further recommend a target following distance, a target speed, or the like in response to the relevance values.

With particular reference to FIGS. 7B, at least one splash zone 122 may be determined, or calculated, by the imaging system 50 based on image data from the initial images. For example, any one of the previous techniques described, including the application of the FCDDNN 92, may allow the imaging system 50 to estimate dimensions of the splash zone 122, such as a depth D, a width W, and a height H of the splash. The dimensions of the splash zones 122 may be determined based on the following distance 120 from the source of the splash to the vehicle 14 and the captured images 86. For example, the following distance 120 may be determined using the distance sensors 34, 36, 38 previously described with respect to FIGS. 1 and 2, and the forwardmost location of the splash may be detected based on image processing of the captured images 86. The difference between the following distance 120 and the front of the splash zone 122 may be calculated by the control circuitry to determine the depth D of the splash zone 122. In this way, the distance detection and the location detection of the system 10 may provide for determining the origin point of the splash, the size of the splash, the likelihood of contacting the water of the splash based on distance and/or speed, and the like.

In the present example, three splash zones 122 are detected by the imaging system 50, with each of the splash zones 122 having a different size. The size of the splash zones 122 may be caused by the sizes of the tires 42, the speeds of the vehicles 14, the lanes that the vehicles 14 are in (e.g., road roughness, potholes, etc.) or any other factor that may influence the size of the tire splash. For example, uneven roadways that may cause puddles, curves in the road (e.g., a slope in the road, turns), or the like may further influence the size of the splash. Based on the size of the splashes, the imaging system 50 may determine the following distance 120 from each or any one of the splash sources 116 (e.g., the other vehicles 14). In general, sizes of the splashes, a density of the splashes, a duration of the splashes, or any other aspect related to the magnitude of the splashes may be detected by the imaging system 50 and used to classify a priority or a ranking (e.g., the relevance values) of the splash events 118 to determine a target lane of the plurality of lanes 126, a target following distance 120 (e.g., a minimum following distance) for the vehicle 14 relative to other vehicles 14, activation of the window clearing system, presentation of messages at the HMI 70, control of the vehicle 14, or any of the responses previously described. The direction of the splashes may further be detected, which may be influenced by wind speed and direction, to enhance estimation of the splash zones 122 and further enhance the response determined by the response control system 54. Such wind speed and direction may be detected from weather sensors or a Global Positioning System (GPS) in communication with the moisture detection system 10.

The moisture detection system 10 may further, or alternatively, estimate the density of moisture conditions, such as the density of the splash zone 122 or the density of rain. For example, based on the amount, distribution, or pattern of blurs 112 or other moisture spots detected on the windshield 18, the moisture detection system 10 can estimate the density of rain and activate the wipers 26 or communicate an indication for the user to operate the wipers 26 in response to the amount, distribution, or pattern exceeding a threshold or matching a target distribution or pattern. For example, if more than 25%, 50%, or 90% of the windshield 18 in the field of view of the imaging device 20 has blurs 112, the imaging system 50 may communicate a signal to the response control system 54 to initiate the wipers 26. In other examples, the sizes of the water droplets 108 and/or blurs 112 may be categorized by the FCDDNN 92 and compared to stored moisture conditions to determine the response of the moisture detection system 10.

In some examples, the moisture detection system 10 may access the position of the vehicle 14 relative to the roadway type. For example, the GPS may provide the position of the vehicle 14, thereby providing the roadway type (e.g., highway, city driving, etc.). In this way, the number of lanes, the motion direction, the construction and/or manner of operation of the roadway (e.g., one-way roads, interstate roads with median, highway with no median) may be determined. Accordingly, the moisture detection system 10 may prioritize some lanes over other lanes or adjust following distances 120 based further on types of the roadways. For example, because the typical speed of a vehicle 14 on an interstate roadway than another roadway, the moisture detection system 10 may suggest a "slow lane" of two lanes based on moisture conditions detected on the interstate roadway.

Although the source lane 126a of the plurality lanes 126 is illustrated as having the same traffic direction as the other of the plurality lanes 126 in the previously-described features, in some examples, the plurality of lanes 126 includes lanes having a first traffic direction and lanes having a second traffic direction. In this example, the imaging system 50 is configured to classify the splash source 116 as being in a lane having the first traffic direction and/or the splash source 116 being in a lane having the second traffic direction. For example, the imaging system 50 may detect oncoming headlights 48 in an adjacent lane and, in response to this detection, classify the adjacent lane as having an opposing traffic direction. Thus, splash from oncoming traffic may be compared to splashes of leading traffic, and the moisture detection system 10 may provide for enhanced response determination for a target lane for the vehicle 14 based on either or both splash events 118 in the first and second traffic directions. It is also contemplated that the distance detection system 52 previously described may be used to further determine the target lane for the vehicle 14 by tracking the following distance 120 from the vehicle 14 to the leading vehicle 14.

Figure 8:
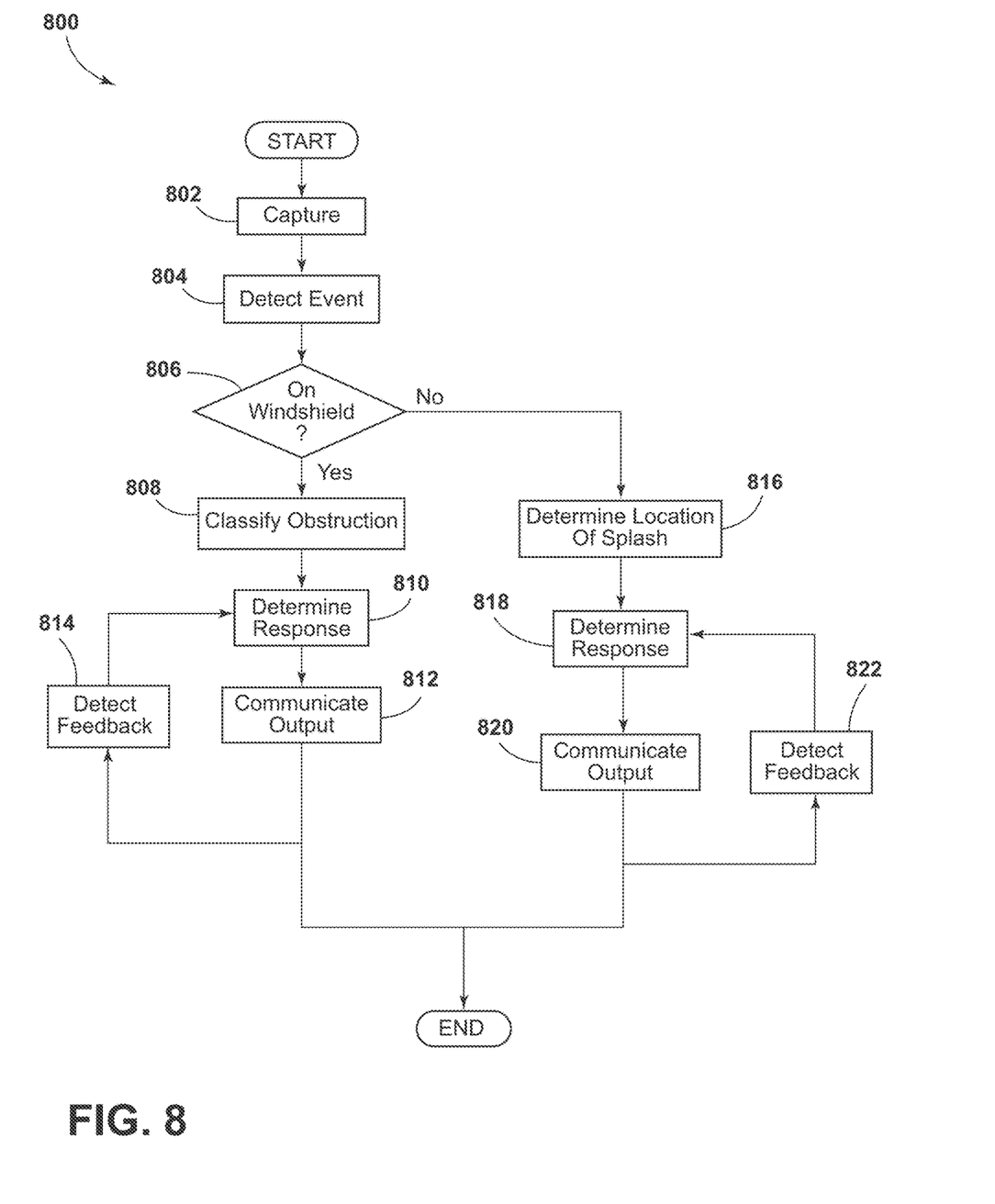
FIG. 8 is an exemplary process carried out by a moisture detection system according to one aspect of the present disclosure.

Referring now to FIG. 8, an exemplary process 800 carried out by the moisture detection system 10 is demonstrated for use with splash detection and moisture condition detection on the windshield 18. At step 802, the imaging device 20 captures images of the region external 12 to the vehicle 14. At step 804, the image processor 88 detects an event in the region next interior to the vehicle 14. For example, the event may be moisture conditions, such as splash events 118, water being on the outer surface 16 of the windshield 18, objects being on the windshield 18, or any other event related to visibility obstruction or distortion. At step 806, the event is classified as being associated with the windshield 18 (e.g., on the windshield 18) or spaced from the windshield 18. For example, if the event is a splash event 118 related to other vehicles 14 ahead of the vehicle 14, as opposed to splashed water on the windshield 18 itself. It is contemplated that the splash event 118 may be classified both as an on-windshield 18 event and an off-windshield 18 event depending on the following distance 120 between the splash source 116 and the vehicle 14. If the event is an obstruction on the outer surface 16 of the windshield 18, the image processor 88 may classify the obstruction at step 808. For example, the imaging system 50 may classify the obstruction as debris or water. Based on classification of the obstruction, at step 810, the moisture detection system 10 determines a response. For example, the response may be to initiate the application of clearing fluid on the windshield 18 in the event that the obstruction is debris, such as moist debris, or activation or adjustment of the speed of one or more of the wipers 26 on the windshield 18 in the event of moisture conditions. At step 812, an output is communicated to initiate the response determined at step 810. It is contemplated that the response may alternatively be a more passive response, such as presenting a message at the display 68 to instruct a user to carry out one or more of the functions that may alternatively be automatically carried out.

At step 814, feedback in the form of manual adjustment or non-operation (e.g., the user not following a recommendation) is communicated to the response control system 54 and/or the imaging system 50 to further refine the response determined in future events. For example, if the user is instructed to activate the wipers 26, and the user does not activate the wipers 26, the target moisture levels for determining wiper activation may be increased to a threshold by the imaging system 50 to limit false responses for future calculations. Such threshold may be the threshold for the FCDDNN 92 previously described or another threshold.

If the event is not related to conditions of the windshield 18, as determined in step 806, the process may continue to determine a location of a splash event 118 at step 816. For example, using the captured images 86, the imaging system 50 may detect the source and/or location (e.g., the splash lane 126a) of the splash events 118 caused around the vehicle 14 (e.g., tire splash). At step 818, the response is determined by the response control system 54. For example, the response may be to adjust the following distance 120 between the splash source 116 and the vehicle 14 by reducing the speed of the vehicle 14. In other examples, the response includes maneuvering of the vehicle 14 to another lane of a plurality of lanes 126. In other examples, the response includes presenting instructions via messaging at the HMI 70 to indicate to the user to maneuver the vehicle 14, to adjust speed of the vehicle 14, or the like. Other examples of the response include adjustments to the window cleaning system, such as activation of the wiper 26, adjustment of the speed of the wiper 26, activation of the pump 74 for applying cleaning fluid, or the like. At step 820, the output may be communicated to initiate the response. Similar to step 812, at step 822, feedback, in the form of action or inaction by the user to undo the response communicated by the response control system 54, is returned to the moisture detection system 10 for enhancing response determination in future conditions in which splash events 118 are detected.

In general, the present moisture detection system 10 enhances responses for the vehicle 14 to limit obstruction and/or distortion of visibility of the region external 12 to the vehicle 14. The image processing techniques employed by the moisture detection system 10 may enhance the room in the interior of the vehicle 14 by allowing the imaging device 20 to be positioned proximate to the windshield 18. Further, the image processing techniques employed herein may provide for enhanced detection of splash sources 116 and/or moisture conditions on the outer surface 16 of the windshield 18. Based on the detection of these moisture events, quick response times for clearing of the windshield 18 and/or optimize maneuvering of the vehicle 14 may be provided by the moisture detection system 10.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an endpoint of a range, the disclosure should be understood to include the specific value or end-point referred to. Whether or not a numerical value or endpoint of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

It is to be understood that variations and modifications can be made on the aforementioned structure without departing from the concepts of the present disclosure, and further, it is to be understood that such concepts are intended to be covered by the following claims unless these claims by their language expressly state otherwise.

What is claimed is:

1. A vehicle, comprising:
a window separating a compartment of the vehicle from a region external to the vehicle;
an imaging device in the compartment and configured to capture an image of the region external to the vehicle through the window;
control circuitry in communication with the imaging device, the control circuitry configured to:
receive the image from the imaging device;
process the image in a fully-connected data description neural network (FCDDNN) trained to determine a moisture level;
detect an obstruction in the image;
correlate the obstruction with a substance on the window;
classify the substance as water or debris based on the moisture level; and
generate an output in response to detection of the obstruction.

2. The vehicle of claim 1, further comprising:
a wiper selectively moveable along the window; and
a window clearing system including a controller in communication with the control circuitry and configured to operate the wiper in response to the output.

3. The vehicle of claim 2, wherein the window clearing system includes a pump for pressurizing cleaning fluid to apply to the window, wherein the controller is configured to selectively operate the pump in response to the output.

4. The vehicle of claim 3, wherein the output generated by the control circuitry is based on the classification of the obstruction as water or debris.

5. The vehicle of claim 4, wherein the controller is configured to operate the wiper in response to classification of the substance as water and operate the pump in response to classification of the substance as debris.

6. The vehicle of claim 4, wherein the imaging device is disposed within 50 millimeters (mm) from the window.

7. The vehicle of claim 3, wherein the control circuitry includes a training module that trains the FCDDNN based on manual operation feedback.

8. The vehicle of claim 7, wherein the manual operation feedback includes manual operation of at least one switch controlling at least one of the wiper and the pump.

9. The vehicle of claim 7, wherein the training module is configured to train the FCDDNN to differentiate between light sources in the region external and the substance on the window.

10. The vehicle of claim 1, wherein the control circuitry is configured to classify a level of optical distortion with the moisture level of the substance.

11. The vehicle of claim 1, wherein the window is a windshield of the vehicle extending at an oblique angle relative to a lens of the imaging device.

12. The vehicle of claim 1, wherein the imaging device is disposed within 15 millimeters of the window.

13. The vehicle of claim 1, wherein the control circuitry is configured to:
detect another vehicle ahead of the vehicle; and
classify the substance as tire splash from the other vehicle.

14. The vehicle of claim 1, further comprising:
an automatic speed control system for the vehicle in communication with the control circuitry, wherein the automatic speed control system is configured to control the speed of the vehicle based on classification of the substance as tire splash from another vehicle.

15. A vehicle, comprising:
a windshield separating a compartment of the vehicle from a region external to the vehicle;
an imaging device in the compartment and configured to capture an image of the region external to the vehicle through the windshield; and
control circuitry in communication with the imaging device and configured to:
receive the image from the imaging device;
detect an obstruction in the image corresponding to a substance on the windshield;
detect another vehicle ahead of the vehicle;
classify the substance as tire splash from the other vehicle; and
generate an output in response to the detection of the obstruction, wherein the imaging device is disposed within 50 millimeters (mm) from the windshield.

16. The vehicle of claim 15, further comprising:
a wiper selectively moveable along the windshield; and
a window clearing system including a controller in communication with the control circuitry and configured to operate the wiper in response to the output.

17. The vehicle of claim 15, wherein the imaging device is disposed within 15 mm of the windshield.

18. The vehicle of claim 15, wherein the control circuitry is configured to classify a level of optical distortion with the moisture level of the substance.

19. A vehicle, comprising:
a windshield separating a compartment of the vehicle from a region external to the vehicle;
an imaging device in the compartment and configured to capture an image of the region external to the vehicle through the windshield; and
control circuitry in communication with the imaging device, the control circuitry configured to:
receive the image from the imaging device;
process the image in a fully-connected data description neural network (FCDDNN) trained to determine a moisture level;
detect an obstruction in the image;
correlate the obstruction with a substance on the windshield;
detect another vehicle ahead of the vehicle; and
classify the substance as tire splash from the other vehicle.

20. The vehicle of claim 19, wherein the control circuitry is configured to control a wiper based on the classification of the substance as water.

* * * * *